Dec. 24, 1957     C. CH. F. CUVIER     2,817,340

HIBERNATING APPARATUS

Filed Nov. 15, 1954

INVENTOR

CLAUDE Ch. F. CUVIER

BY

*Watson, Cole, Grindle & Watson*

ATTORNEYS

United States Patent Office 2,817,340
Patented Dec. 24, 1957

2,817,340

HIBERNATING APPARATUS

Claude Ch. F. Cuvier, Nice, France

Application November 15, 1954, Serial No. 468,909

Claims priority, application France December 24, 1953

1 Claim. (Cl. 128—373)

The present invention has for its object an improved air-hibernating apparatus which enables a very great increase to be obtained in the chances of survival of sick persons suffering from serious attacks of fever or of toxicosis and, in general facilitating the treatment of all clinical cases and in particular the fixation of the nerves by the "lytic cocktail" and artificial hibernation.

One of the essential special features of the invention is constituted by a hibernation bag cooled by means of previously refrigerated air which is also preferably condition and sterilised. This air passes preferably through a closed circuit starting from the refrigerating apparatus, passing to the hibernation bag and returning to the said apparatus.

In one form of embodiment, the air circuit comprises, on the one hand:

A group of apparatus contained in a heat-insulated casing, namely: an evaporator, a vessel containing calcium chloride for desiccating the air, a thermostat for controlling the temperature, a fan and an ultra-violet ray tube; and, on the other hand:

A hibernation bag made of flexible material, for example, of polyvinyl chloride, poly-ethylene, etc.

Further special features of the invention will become apparent from the description which follows below in respect of the attached drawings, which are given by way of example only and not in any sense by way of limitation, and which will make it quite clear how the invention may be carried into effect, the special features which are brought out, either in the drawings or in the text, being understood to form a part of the said invention.

Figure 1:
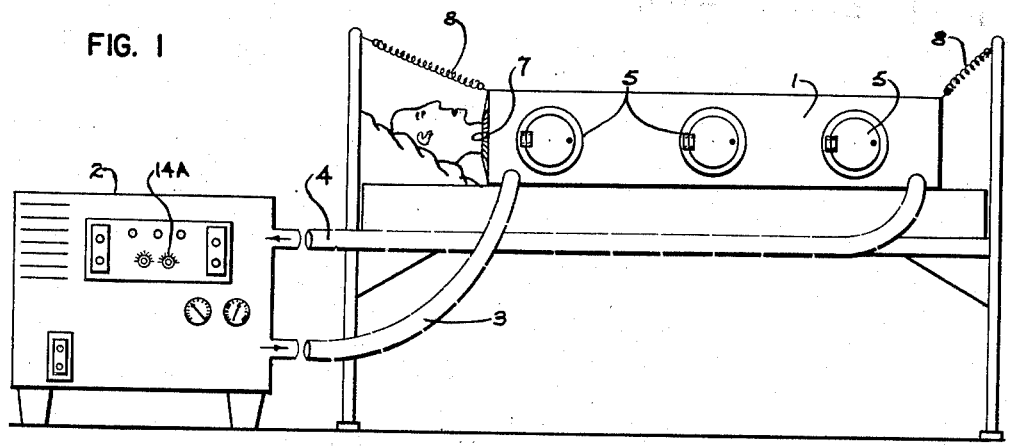
Fig. 1 is a view in elevation of a form of embodiment of an air hibernating apparatus in accordance with the invention.

In the form of embodiment shown in Fig. 1, the flexible hibernation bag is shown at 1, in which air is circulated at a pre-determined volume of flow; the air passes through a closed circuit, entering through the conduit 3 and leaving through the conduit 4. This air is previously refrigerated and is preferably also dried and sterilised in the refrigerating apparatus or hibernation unit 2.

Figure 2:
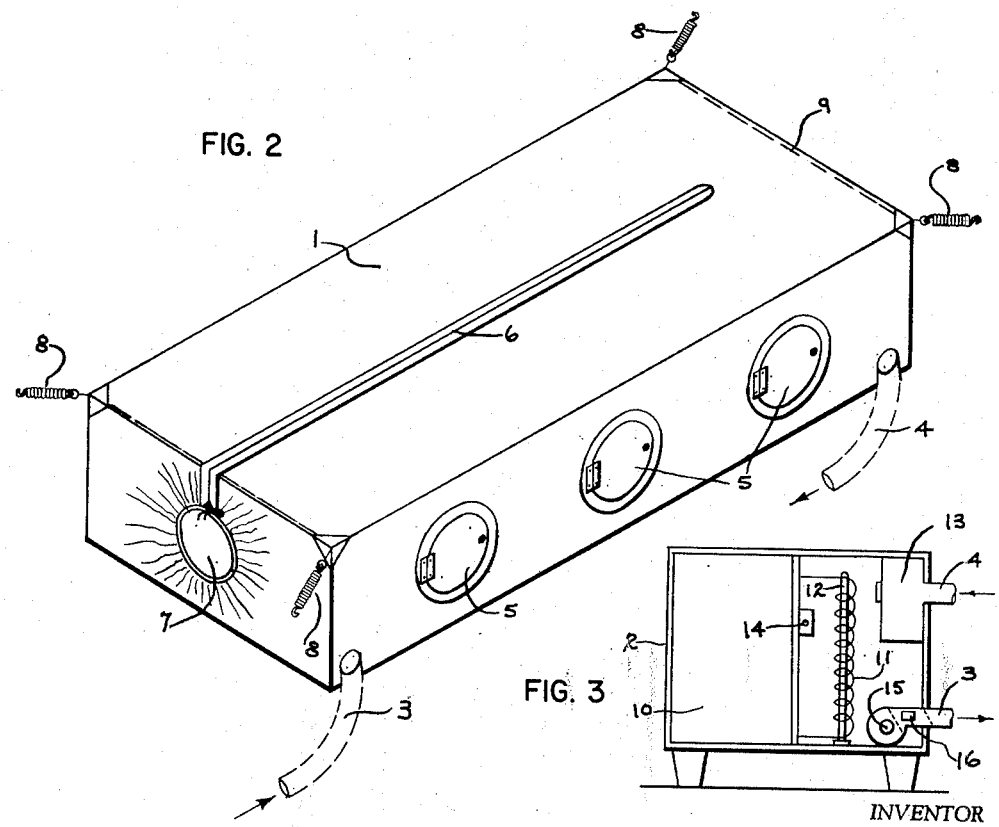
Fig. 2 is a perspective view of the flexible hibernating bag.

In the form of construction shown in Fig. 2, the hibernating bag is made of polyvinyl chloride having a thickness of 55/100 of a millimeter for example, the bag being welded together at its corners so as to make it completely airtight. The conduits for the admission and the discharge of the air are shown at 3 and 4; at 5 are provided air-tight port-holes of Plexiglas through which the needs of the sick person may be attended to. There is shown at 6 a sliding fastener of the lightning-fastener type which is air-tight and through which the sick person is placed inside the bag. At 7 there is provided a circular fitting having a band of sponge rubber for the purpose of closing the bag around the neck of the sick person so as to produce an air-tight closure similar to that normally provided in iron lung apparatus. At the corners, at 8, are provided springs which maintain the rectangular shape of the bag when they are hooked on to the upper portions of the bed-frame on which the patient is lying (see Fig. 1). Metal rods 9 are also provided to stiffen the whole assembly.

Figure 3:
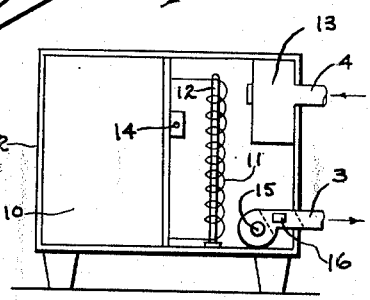
Fig. 3 is a view in cross-section of the air-conditioning casing.

Fig. 3 gives a diagrammatic view of the refrigerating unit. The heat-insulated casing 2 has a first compartment containing a box 10 in which are mounted the Freon compressor and the expansion unit (not shown in detail). The other compartment comprises:

The evaporator coil 11,
The ultra-violet ray tube 12 for sterilising the air,
The receptacle 13 for the chloride of calcium which the air to be dried passes over during its return circuit,
The thermostat 14 responsive to the surrounding air temperature, and which regulates the degree of refrigeration, this thermostat being itself controlled from the exterior by means of a knob 14a shown on Fig. 1,
The fan 15 which serves to circulate the cold air through the hibernation bag by means of the conduit 3.

The ultra-violet rays which sterilise the air produce ozone and this may be harmful in certain cases, especially because of its irritant effect on wounds. In order to overcome this difficulty, it is preferable to add to the air circuit an emitter 16 of infra-red rays placed in the said circuit on the downstream side of the ultra-violet ray emitter before the point of arrival of the air into the hibernating bag 1. The infra-red rays destroy the ozone so that the new combination will enable the air to be sterilised by the ultra-violet rays without any ill-effect on the patient treated.

The part of the apparatus intended to receive the body of the patient treated may be simplified by forming this portion as a simple bag of polyvinyl chloride, poly-ethylene or other flexible material or fabric which is sufficiently air-tight, this being provided with a circular portion at its opening adapted to fit around the neck. In addition, the bag may be provided with openings through which the hands are passed, these openings being fitted with air-tight slide fasteners.

Openings of this kind with slide fasteners may also be provided at various parts of the bag to replace the port-holes 5 previously referred to.

The thickness of the bag of flexible material may be 30 hundredths of a millimeter, this indication being given as an example and not in any restrictive sense.

In a further very simple form of embodiment, there are added to the bed sheets of the patient treated two sheets of flexible material, such as polyvinyl chloride for example or other flexible fabric, which are placed inside the bed, semi-cylindrical metal arches being then arranged inside these sheets. The two conduits 3 and 4 of the air circuit of the hibernating apparatus will be passed under these sheets, one at the head, and the other at the foot of the bed.

It will, of course, be understood that modifications may be made to the forms of embodiment which have just been described, in particular by the substitution of equivalent technical means, without thereby departing from the spirit or from the scope of the present invention.

What I claim is:

An apparatus for treating a sick person by means of cold air comprising an enclosure designed to contain the body of the sick person exclusive of his head, said enclosure including a substantially rigid frame adapted to be mounted on a bed, a bag of airtight material mounted on said frame, means for securing said bag in air-tight relationship around the neck of the sick person, air-tight portholes in said bag through which the needs of the sick person may be attended to, a closed conduit system connected to openings provided at each end of said bag, means in said system for chilling said air, means coupled to the system for sterilizing said air including a source of ultra-violet rays and a source of infra-red rays disposed downstream from the first source and means in said system for removing the moisture from said air.

References Cited in the file of this patent

UNITED STATES PATENTS

| | | |
|---|---|---|
| 26,663 | French | Jan. 3, 1860 |
| 1,476,460 | Osborn | Dec. 4, 1923 |
| 2,033,040 | Lini | Mar. 3, 1936 |
| 2,093,834 | Gaugler | Sept. 21, 1937 |
| 2,099,954 | Cook | Nov. 23, 1937 |
| 2,184,644 | Homberger | Dec. 26, 1939 |
| 2,559,654 | Netteland | July 10, 1951 |